(No Model.)

T. P. SKELLENGER.
FARM GATE.

No. 346,506. Patented Aug. 3, 1886.

WITNESSES:

INVENTOR:
T. P. Skellenger
BY Munn & Co.
ATTORNEYS.

UNITED STATES PATENT OFFICE.

THEODORE P. SKELLENGER, OF MORRISTOWN, NEW JERSEY.

FARM-GATE.

SPECIFICATION forming part of Letters Patent No. 346,506, dated August 3, 1886.

Application filed August 3, 1885. Serial No. 173,405. (No model.)

*To all whom it may concern:*

Be it known that I, THEODORE P. SKELLENGER, of Morristown, in the county of Morris and State of New Jersey, have invented a new and Improved Farm-Gate, of which the following is a full, clear, and exact description.

My invention relates to certain improvements in sliding gates; and the invention consists of the construction, arrangement, and combination of parts, as hereinafter described and claimed.

Reference is to be had to the accompanying drawings, forming part of this specification, in which similar letters of reference indicate corresponding parts in both the figures.

Figure 1:
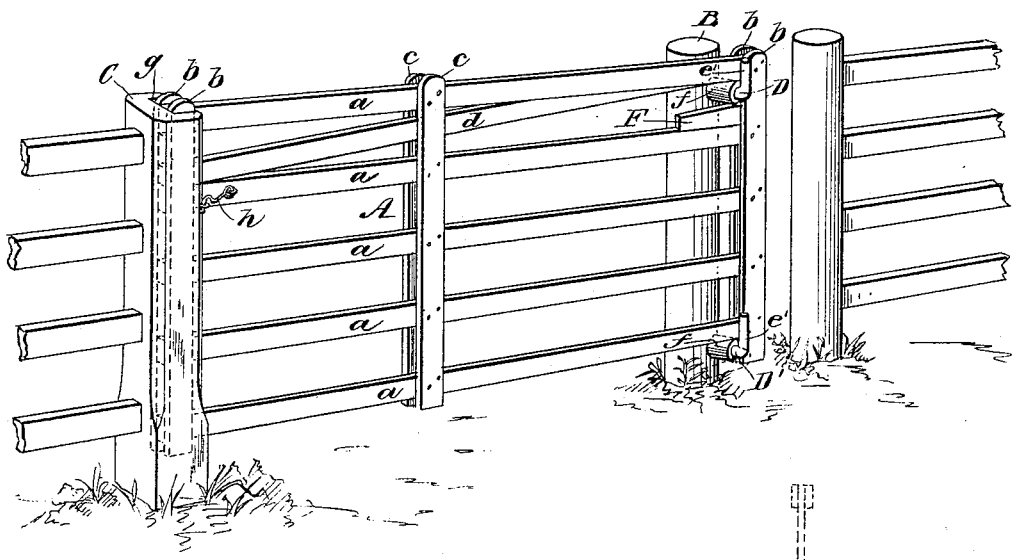
Figure 2:
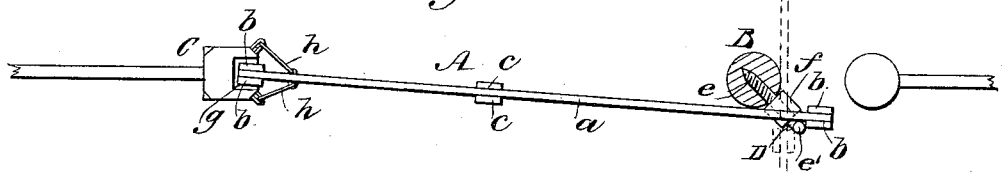

Figure 1 is a perspective view of my new and improved sliding gate; and Fig. 2 is a plan view thereof, showing one post in section, and showing the gate closed in full lines and open in dotted lines.

A represents the gate; B, the post to which the gate is attached; and C represents the jamb-post, against which the gate closes.

The gate A is composed mainly of the narrow boards *a a*, secured together by the end cross-pieces, *b b*, and central cross-pieces, *c c*, nailed or bolted to the boards *a*. Between the two upper boards *a* is secured the inclined or diagonally-arranged board *d*, that supports the gate, and serves to elevate it as it is shoved backward for opening the gate, to cause it to clear snow or rough ground.

The gate A is attached to the post B by means of the two hooks D D', each formed with a screw-shank, *e*, to enter the post, as shown in Fig. 2, so that the outer hook portions, *e'*, may be easily turned to stand in a in vertical position, as shown in full lines in Fig. 1, to hold the gate in place upon them, or to a horizontal position, to permit the gate to be readily detached from the post B.

To prevent unnecessary friction in opening and closing the gate, I place upon the hooks D D' the short sleeves or collars *f*, on which the lower board *a* and inclined board *d* rest, to act as rollers for the gate.

The jamb-post C is, by preference, recessed, as shown at *g*, to receive the front end of the gate, as shown clearly in Fig. 2, so that the gate cannot readily be swung to either side, whether it be secured by hooks *h* or not.

A little below the inclined bar *d*, at the rear end of the gate, I attach the short piece F, that acts as a stop, in connection with the upper hook, D, to prevent the gate, when closed, from being elevated by stock rubbing against it or crawling under it.

By constructing the gate as described it is made very cheap and very convenient, and easy to open and close, and the inclined board *d*, besides serving to cause the gate to elevate itself when shoved back to open it, acts as a truss or brace to strengthen and stiffen the gate, and this board facilitates the closing of the gate, as it will shut of its own accord by simply lifting the front end of the gate off from the ground, and when the gate is closed it rests at its rear end upon the lower inclined edge of the board *d*, which tends to force the gate forward against the jamb-post C, so that it will always remain between the cheek-pieces of the jamb-post, whether the gate be locked or hooked or not.

I am aware that it is not new to employ a gate hung upon a roll and having a slat or board with an inclined cut-away surface to permit its elevation when opened, and to employ a cleat or stop and roll at the forward end of the gate to prevent the raising or lifting of the gate when closed by animals.

Having thus described my invention, what I claim as new, and desire to secure by Letters Patent, is—

The right-angled hinging hooks connected to the hinge-posts obliquely to the plane of the closed position of the gate, and having loose sleeves upon their horizontal portions, in combination with the gate having between its two upper boards or slats the inclined board, with its lower end at the front end of the gate, said gate also having a stop or block arranged below the upper rear end of the said inclined board and in contact with the lower side of the upper hinging sleeved hook, substantially as shown and described, and for the purpose set forth.

THEODORE P. SKELLENGER.

Witnesses:
   CHARLES A. RATHBUN,
   JOHN B. VREELAND.